A. M. DANIELS.
LAMP-WICK.
No. 170,995. Patented Dec. 14, 1875.
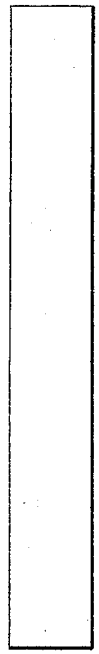
Witnesses.
Wendell R. Curtis
John T. Peters
Inventor.
Aaron M. Daniels
by Theo. G. Ellis, Attorney

UNITED STATES PATENT OFFICE.

AARON M. DANIELS, OF HARTFORD, CONNECTICUT.

IMPROVEMENT IN LAMP-WICKS.

Specification forming part of Letters Patent No. 170,995, dated December 14, 1875; application filed October 25, 1875.

*To all whom it may concern:*

Be it known that I, AARON M. DANIELS, of Hartford, in the county of Hartford and State of Connecticut, have invented certain new and useful Improvements in Lamp-Wicks; and I do hereby declare that the following is a full, clear, and exact description thereof, whereby a person skilled in the art can make and use the same.

My invention relates to such wicks as are suitable for the ordinary oil, petroleum, or burning-fluid lamps; and its object is to provide a better conductor for the oil to the flame than the common braided cotton wicks now generally in use.

My invention consists in a wick having an interior part, composed chiefly of cotton or other vegetable fiber, covered with a layer or coating of wool or animal fiber upon the sides, with the whole felted together, so as not to present the cords or threads found in the common woven or braided lamp-wicks.

The interior part of my improved wick possesses the required capillarity for raising the fluid to be burned, while the exterior is a non-conductor of oil and heat, thus making the feed to the flame central, and preventing the heat from being communicated to the metal of the lamp to so great a degree as is usual.

My improved wicks are made by carding out a thin sheet of cotton or vegetable fiber, mixed with about three per cent. of wool, hair, or silk, and covering the same with a thin layer on each side of wool or animal hair, by any of the usual methods of felting. This sheet is then cut up, by hand or proper machinery, into strips of the different sizes used for lamp-wicks.

My improved wick can be used in all lamps burning petroleum, animal oils, or any of the manufactured hydrocarbon fluids; and its advantages are, that it lasts longer without cutting, is more economical of oil, and presents an evener surface when cut than any of the ordinary wicks. It also raises and lowers more evenly, gives a clearer flame, and communicates less heat to the lamp.

What I claim as my invention is—

A lamp-wick composed of a central part, consisting chiefly of cotton or vegetable fiber, with a covering of wool or animal hair felted onto it, substantially as herein specified.

AARON M. DANIELS.

Witnesses:
 THEO. G. ELLIS,
 WENDELL R. CURTIS.